US010118703B2

(12) United States Patent
Mihai et al.

(10) Patent No.: US 10,118,703 B2
(45) Date of Patent: Nov. 6, 2018

(54) ARMREST FOR AIRCRAFT SEAT, ASSOCIATED SEAT AND PROCESS

(71) Applicant: DASSAULT AVIATION, Paris (FR)

(72) Inventors: Michel Mihai, Montbeliard (FR); Gaëtan Lamothe, Issy les Moulineaux (FR)

(73) Assignee: DASSAULT AVIATION, Paris (FR)

( * ) Notice: Subject to any disclaimer, the term of this patent is extended or adjusted under 35 U.S.C. 154(b) by 18 days.

(21) Appl. No.: 15/489,680

(22) Filed: Apr. 17, 2017

(65) Prior Publication Data
US 2017/0297722 A1 Oct. 19, 2017

(30) Foreign Application Priority Data

Apr. 18, 2016 (FR) ..................................... 16 00646

(51) Int. Cl.
*A47C 4/00* (2006.01)
*B64D 11/06* (2006.01)

(52) U.S. Cl.
CPC ................................ *B64D 11/0644* (2014.12)

(58) Field of Classification Search
CPC .. A61G 7/0507; A61G 5/125; A61G 13/1235; A47C 7/54; A47C 1/03; A47C 1/03255; A47C 3/00; A47C 1/032; A47C 1/022; B60N 2/77
See application file for complete search history.

(56) References Cited

U.S. PATENT DOCUMENTS

| 2,409,316 | A |   | 10/1946 | Rogers |
|-----------|---|---|---------|--------|
| 3,191,995 | A | * | 6/1965  | Shelton ................... B60N 2/76 297/411.33 |
| 8,449,029 | B2 | * | 5/2013 | Runde ................... B60N 2/757 297/113 |

(Continued)

FOREIGN PATENT DOCUMENTS

| EP | 518358 A1  | 12/1992 |
|----|------------|---------|
| EP | 1566335 A1 | 8/2005  |

(Continued)

OTHER PUBLICATIONS

French Search Report of priority application.

*Primary Examiner* — Shin H Kim
(74) *Attorney, Agent, or Firm* — Davidson, Davidson & Kappel, LLC

(57) ABSTRACT

Armrest for aircraft seat, associated seat and process are provided. The armrest includes a stationary part (12) intended to be connected to the seat, a moving part (14) movable relative to the stationary part (12), between a high position in which the moving part (14) is intended to protrude above a seat bottom of the seat and a low position, and a maneuvering mechanism (18) able to guide the movement of the moving part (14) between the high position and the low position. The maneuvering mechanism (18) includes at least a first connecting rod (26) and a second connecting rod (27), each independently connecting the stationary part (12) to the moving part (14), the first connecting rod (26) and the second connecting rod (27) being arranged parallel to one another during the movement of the moving part (14) between the high position and the low position.

16 Claims, 3 Drawing Sheets

(56) References Cited

U.S. PATENT DOCUMENTS

| | | | |
|---|---|---|---|
| 8,585,146 B1* | 11/2013 | Giasson | B60N 2/0747 |
| | | | 297/344.1 |
| 9,058,052 B2* | 6/2015 | Bruns | A47C 7/54 |
| 9,756,954 B2* | 9/2017 | Andrienko | A47C 21/08 |
| 2004/0135418 A1 | 7/2004 | Costaglia | |
| 2005/0184566 A1 | 8/2005 | Baumann et al. | |
| 2006/0087158 A1* | 4/2006 | Kramer | A47C 1/022 |
| | | | 297/29 |
| 2007/0210209 A1 | 9/2007 | Saint-Jalmes et al. | |
| 2008/0150341 A1 | 6/2008 | Salewski | |
| 2009/0079238 A1* | 3/2009 | Plikat | A47C 1/03255 |
| | | | 297/217.2 |
| 2011/0084527 A1 | 4/2011 | Marini et al. | |
| 2012/0074751 A1 | 3/2012 | De La Garza et al. | |
| 2014/0167461 A1 | 6/2014 | Cailleteau | |
| 2016/0193095 A1* | 7/2016 | Roussy | A61G 7/002 |
| | | | 5/11 |

FOREIGN PATENT DOCUMENTS

| | | |
|---|---|---|
| EP | 1927504 A1 | 6/2008 |
| EP | 2721964 | 4/2014 |
| FR | 1095113 A | 5/1955 |
| FR | 2424828 A1 | 11/1979 |
| FR | 2848793 A1 | 6/2004 |
| FR | 2963587 A1 | 2/2012 |
| GB | 746313 A | 3/1956 |
| WO | WO2004037042 A2 | 5/2004 |
| WO | WO2005030580 A1 | 4/2005 |
| WO | WO2006038847 A1 | 4/2006 |
| WO | WO06110227 A2 | 10/2006 |
| WO | WO08052746 | 5/2008 |
| WO | WO08140938 A1 | 11/2008 |
| WO | WO09114765 A1 | 9/2009 |
| WO | WO10031907 A1 | 3/2010 |

* cited by examiner

ARMREST FOR AIRCRAFT SEAT, ASSOCIATED SEAT AND PROCESS

This claims the benefit of French Patent Application FR 16 00646, filed Apr. 18, 2016 and hereby incorporated by reference herein.

The present invention relates to an armrest for an aircraft seat, including:
- a stationary part intended to be connected to the seat,
- a moving part movable relative to the stationary part, between a high position in which the moving part is intended to protrude above a seat bottom of the seat and a low position.

BACKGROUND

In corporate planes or in higher classes of commercial planes, the aircraft seats are typically designed to offer maximum comfort to the passengers on board the aircraft. In particular, they are provided with armrests allowing the passenger's arms to bear comfortably. For safety and comfort reasons, one feature of the armrest is that it can be moved between a deployed upper position and a retracted position, in particular to facilitate movements by the passenger when he wishes to sit down or leave his seat.

The operation of such an armrest requires using a maneuvering mechanism that may be relatively bulky.

However, in the corporate plane sector, the seat must also have a satisfactory aesthetic appearance. In particular, the mechanism making it possible to move the armrest is preferably hidden from the user's view. The bulk of the mechanism must be limited.

Document WO 2005/030580 discloses a mechanism for maneuvering an armrest between a retracted position and a deployed position.

This mechanism is not fully satisfactory. Indeed, the maneuvering mechanism has a considerable bulk.

SUMMARY OF THE INVENTION

One aim of the invention is therefore to provide a movable aircraft seat armrest offering good perceived quality, while decreasing the bulk of the maneuvering mechanism.

To that end, an armrest of the aforementioned type is provided, characterized in that the maneuvering mechanism includes at least a first connecting rod and a second connecting rod, each independently connecting the stationary part to the moving part, the first connecting rod and the second connecting rod being arranged parallel to one another during the movement of the moving part between the high position and the low position.

The armrest includes one or more of the following features, considered alone or according to any technically possible combination:
- the maneuvering mechanism includes a third connecting rod, connecting the stationary part to the moving part, the third connecting rod being arranged parallel to the first connecting rod and the second connecting rod during the movement of the moving part between the high position and the low position;
- the first connecting rod, the second connecting rod and the third connecting rod are mounted rotating on the stationary part respectively around a first rotation axis, a second rotation axis and a third rotation axis, the third rotation axis being situated separated from a plane containing the first rotation axis and the second rotation axis;
- the maneuvering mechanism includes a member stressing the moving part toward the high position;
- from an intermediate position between the high position and the low position, the member stressing the moving part is able to stress the moving part toward the low position;
- the stressing member includes a pneumatic cylinder connected at a first end to the moving part, and at a second end to one of the connecting rods;
- the second end of the pneumatic cylinder is articulated to one end of the connecting rod, the second end of the pneumatic cylinder being rotatable jointly with the end of the connecting rod;
- the armrest includes a trim cover defining an upper surface for bearing of a user's arm, the trim cover being supported by the moving part and hiding the stationary part and the maneuvering mechanism;
- the moving part defines a central recess, the cover defining a through opening coinciding with the central recess, the maneuvering mechanism and the stationary part being situated separated from the central recess and the through opening;
- the armrest includes at least one connection intended to connect the stationary part to the seat, the moving part defining a passage aperture for the connection connecting the stationary part to the seat, during the movement of the moving part between the high position and the low position, the passage aperture advantageously being in the form of an arc of circle;
- the moving part defines at least one aperture for mounting the armrest on the seat, the mounting aperture emerging horizontally in the passage aperture;
- the armrest includes a releasable locking system for locking the moving part in the high position and/or the low position;
- the stationary part is L-shaped.

An aircraft seat is also provided including:
- a framework,
- a seat bottom mounted on the framework,
- a seatback mounted on the framework, and
- at least one armrest as defined above, the stationary part being fastened on the framework.

A method for maneuvering an armrest described above is provided, including, from the low position of the moving part, a step for moving the moving part toward the high position via the maneuvering mechanism, the first connecting rod and the second connecting rod remaining parallel to one another between the low position and the high position.

The method may include the following features:
- the armrest includes a member stressing the moving part toward the high position, the method including, from the high position of the moving part, the following steps:
- moving the moving part toward the low position, by exerting a force against the stressing member, to an intermediate position between the high position and the low position, and
- past the intermediate position, stressing the moving part toward the low position via the stressing member.

BRIEF SUMMARY OF THE DRAWINGS

The invention will be better understood upon reading the following description, provided solely as an example and done in reference to the appended drawings, in which.

DETAILED DESCRIPTION

Figure 1:
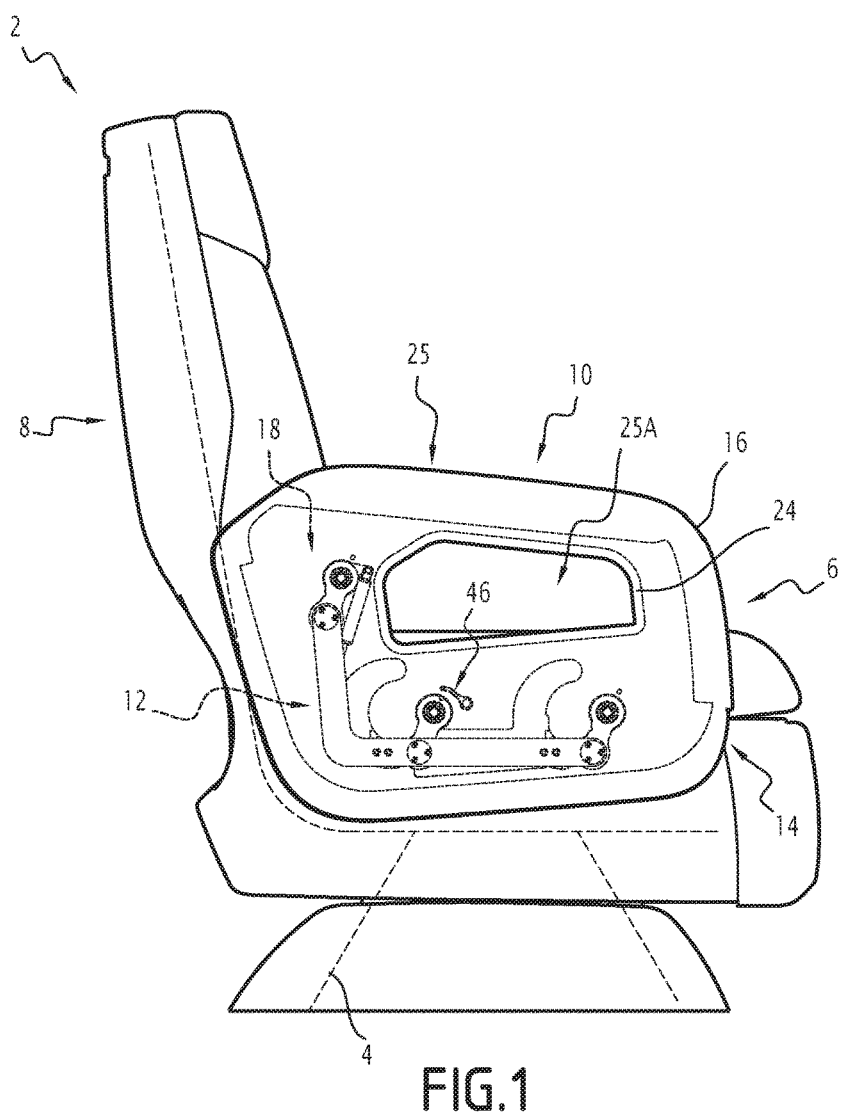
FIG. 1 is a profile view of an aircraft seat according to an embodiment of the invention.

An aircraft seat 2 according to an embodiment of the invention is illustrated in FIG. 1.

As illustrated in FIG. 1, the aircraft seat 2 includes a framework 4, a seat bottom 6 mounted on the framework 4, a seatback 8 mounted on the framework 4, and at least one retractable armrest 10, advantageously two armrests 10 situated on either side of the seat bottom 6.

Figure 2:
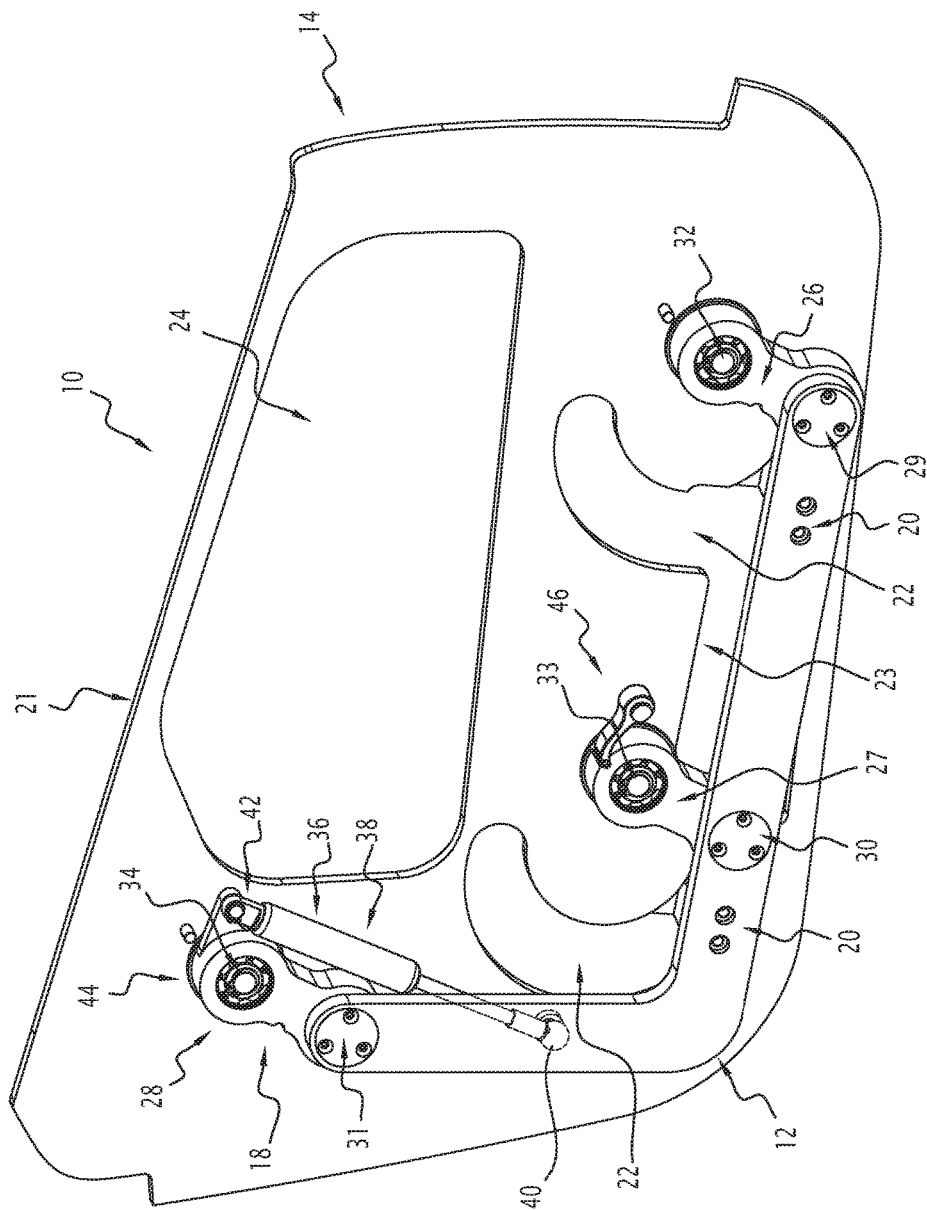
FIG. 2 is a profile view of an armrest of the seat in FIG. 1 in the high position.
Figure 3:
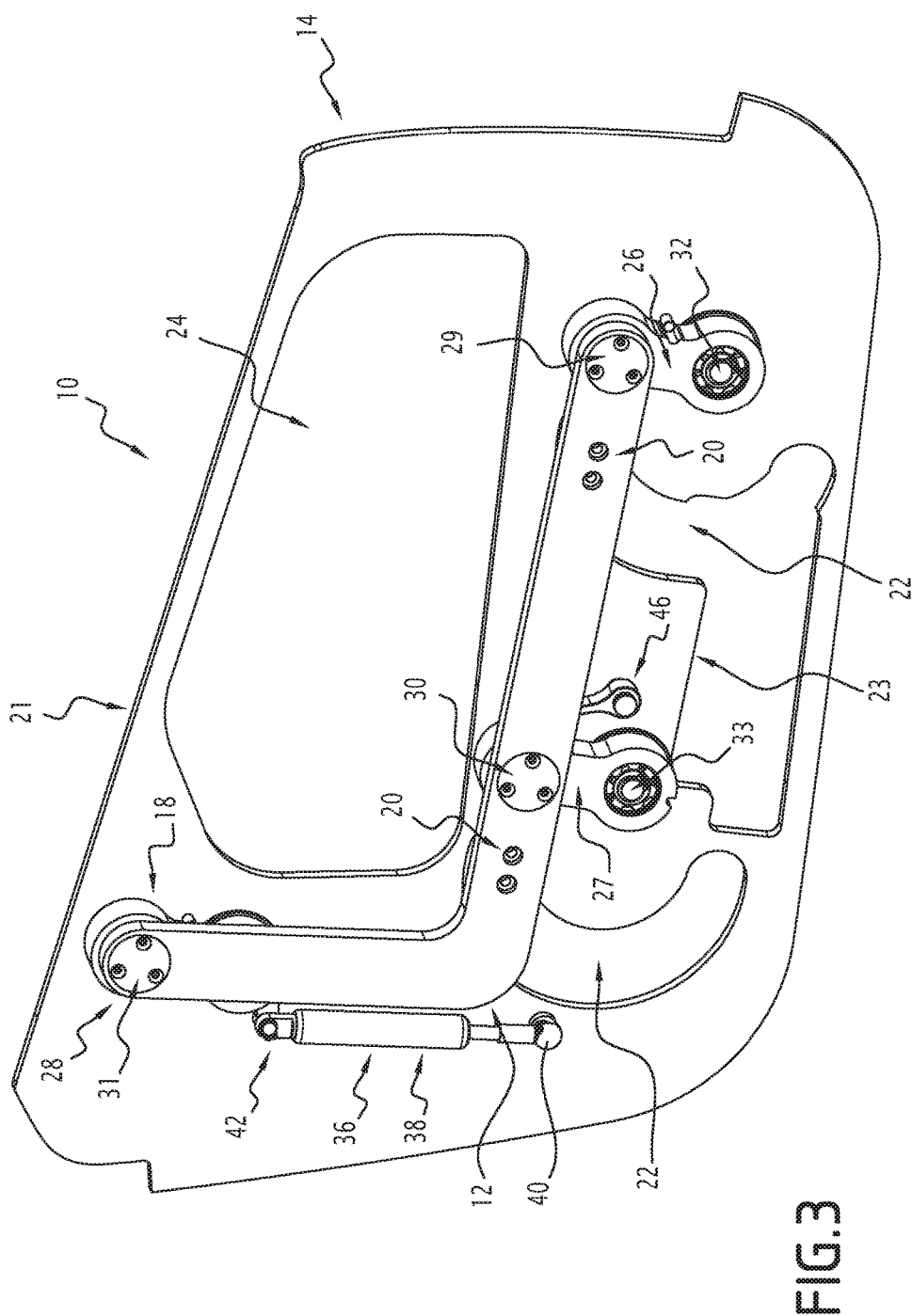
FIG. 3 is a profile view of an armrest of the seat in FIG. 1 in the low position.

The armrest 10 is illustrated more precisely in FIGS. 2 and 3. It includes a stationary part 12 mounted secured on the framework 4, and a moving part 14, movable relative to the stationary part 12 between a high position and a low position.

In reference to FIG. 1, the armrest 10 also comprises a trim cover 16, supported by the moving part 14, and a maneuvering mechanism 18 for maneuvering the moving part 14 between its high position and its low position.

The armrest 10 further includes at least one connection 20 connecting the stationary part 12 to the framework 4.

The stationary part 12 is laterally fastened to the framework 4 of the seat 2, via each connection 20.

The stationary part 12 is for example L-shaped, with a horizontal region extending along the seat bottom 6 and a substantially vertical region protruding upward relative to the horizontal region.

The moving part 14 is movable in curved translation over an arc of circle relative to the stationary part 12 between the high position, illustrated in FIG. 2, in which the moving part 14 protrudes above the seat bottom 6 of the seat 2, and the low position, illustrated in FIG. 3, in which the moving part 14 comes closer to the seat bottom 6.

The moving part 14 includes a frame 21 that defines, for each connection 20, a passage aperture 22 for the connection 20, during the movement of the moving part 14 between the high position and the low position. Each passage aperture 22 advantageously assumes an arc of circle shape.

In the embodiment of FIGS. 2 and 3, the armrest 10 includes two connections 20 connecting the stationary part 12 to the seat 2. The frame 21 thus defines two apertures 22, in the form of an arc of circle, longitudinally spaced apart.

The frame 21 advantageously defines a mounting aperture 23 intended to facilitate mounting of the armrest 10 on the seat 2. The mounting aperture 23 here is horizontal, emerging in a passage aperture 22.

The frame 21 also defines a central recess 24. The maneuvering mechanism 18 and the stationary part 12 are mounted on the frame 21 separated from the central recess 24.

The trim cover 16 is shown in FIG. 1. For clarity reasons, the armrest 10 is illustrated in FIGS. 2 and 3 without the cover 16.

The cover 16 is fastened on the frame 21 that it covers. It also hides the stationary part 12 and the maneuvering mechanism 18.

It has an upper bearing surface 25 for an arm of the user of the seat. It optionally contains a foam part positioned below the upper bearing surface 25.

In the assembly illustrated in the figures, the cover 16 is open-worked. It has a central through opening 25A, with a shape coinciding with the recess 17 arranged in the frame 21.

The through opening 25A emerges laterally opposite the seat bottom 6.

The maneuvering mechanism 18 is able to guide the movement of the moving part 14 between the high position and the low position. The maneuvering mechanism 18 includes at least a first connecting rod 26 and a second connecting rod 27, forming a parallelogram.

Advantageously, the maneuvering mechanism 18 includes a third connecting rod 28 connecting the stationary part 12 to the moving part 14.

The first connecting rod 26 and the second connecting rod 27 each independently connect the stationary part 12 to the moving part 14. The first connecting rod 26 and the second connecting rod 27 are arranged parallel to one another during the movement of the moving part 14 between the high position and the low position.

The third connecting rod 28 is arranged parallel to the first connecting rod 26 and the second connecting rod 27 during the movement of the moving part 14 between the high position and the low position.

The first connecting rod 26, the second connecting rod 27 and the third connecting rod 28 are mounted rotating on the stationary part 12 respectively around a first rotation axis 29, a second rotation axis 30 and a third rotation axis 31.

The third rotation axis 31 is situated in the vertical region of the stationary part 12, separated from a plane containing the first rotation axis 29 and the second rotation axis 30. This plane here passes through the horizontal region of the stationary part 12.

The connecting rods 26, 27 and 28 are each articulated on the moving part 14 at a second end, respectively around a fourth axis 32, a fifth axis 33 and sixth axis 34.

Each articulation comprises a bearing, for example a ball bearing, inserted between a housing of the connecting rod and the axis on which the connecting rod is mounted.

The third connecting rod 28 as described above sees to the stability of the movement of the moving part 14, in particular when the first connecting rod 26 and the second connecting rod 27 are aligned during the movement.

During the passage of the moving part 14 from the low position to the high position, the moving part 14 is rotated globally around an axis situated behind the seat 2, without pivoting around itself.

Thus, the orientation of the upper bearing surface 25 relative to the horizontal remains constant.

The maneuvering mechanism 18 also includes a member 36 stressing the moving part 14 toward the high position.

The stressing member 36 for example includes a pneumatic cylinder 38. At a first end 40, the pneumatic cylinder 38 is connected to the moving part 14, and at a second end 42, the pneumatic cylinder 38 is connected to one of the connecting rods 26, 27, 28, here to the third connecting rod 28.

Advantageously, the pneumatic cylinder 38 is movable between a compressed position, when the moving part 14 is in the low position, and an extended position, when the moving part 14 is in the high position.

The second end 42 of the pneumatic cylinder 38 is articulated to one end 44 of the connecting rod 28. The end 44 of the connecting rod 28 is advantageously the end connecting the connecting rod to the moving part 14. The second end 42 of the pneumatic cylinder 38 is thus jointly rotatable with the end 44 of the connecting rod 28.

The stressing member 36 stresses the moving part 14 toward the high position, between the high position and at least one intermediate position between the high position and the low position. Advantageously, it stresses the moving part 14 toward the low position between the intermediate position and the low position.

The intermediate position corresponds to the position in which the direction of the force exerted by the pneumatic cylinder 38, here the line passing through the ends 40, 42 of the cylinder 38, passes through the articulation axis 34 of the connecting rod 28 connected to the cylinder 38 on the moving part 14.

The maneuvering mechanism 18 advantageously includes a releasable locking system 46 for locking the moving part 14 in the high position. The locking system 46 can be activated by default when the moving part 14 is raised in the high position. It can be actuated by the user to selectively release the moving part 14 from the high position.

In the example shown in FIG. 2, the locking system 46 includes a rotating pawl, mounted on the moving part 14, able to cooperate with a slit arranged in one of the connecting rods, here the connecting rod 27. The cooperation between the pawl and the slit occurs when the moving part 14 is in the high position.

The pawl is then able to be maneuvered on command by a user to rotate it and release it from the slit.

The method for maneuvering the armrest 10 according to an embodiment of the invention will now be described.

To raise the armrest 10 from the low position of the moving part 14 of the armrest 10, the user exerts a force in the forward direction on the moving part 14, to move it to the intermediate position.

From the intermediate position, the stressing member 36 stresses the moving part 14 toward the high position.

The movement of the moving part 14 is guided by the first connecting rod 26, the second connecting rod 27 and the third connecting rod 28, which remain parallel to one another during the movement between the low position and the high position. This maintains the orientation of the moving part 14 and the frame 21 relative to the horizontal.

Once the moving part 14 is in the high position, the releasable locking system 46 locks the moving part 14 in the high position. In the example of FIG. 2, the pawl is inserted in the slit arranged in the connecting rod 27.

To lower the armrest 10 again from the high position of the moving part 14, the user releases the locking system 46.

The user then exerts a force on the moving part 14 toward the low position, to move it to the intermediate position, the stressing member 36 opposing the movement of the moving part 14 toward the low position.

From the intermediate position, the stressing member 36 stresses the moving part 14 toward the low position. The high position and the low position are therefore stable positions of the moving part.

Alternatively, the locking system 46 can be actuated to lock the moving part 14 in the low position as well. To raise the armrest 10 from the low position of the moving part 14, the user then commands the locking system 46 to release the movement of the moving part 14. When the armrest 10 is lowered again by the user from the high position of the moving part 14 to the low position, and once the moving part 14 is in the low position, the releasable locking system 46 locks the moving part 14 in the low position.

Alternatively, the armrest 10 includes a motorized system, configured to move the moving part 14 from the high position to the low position or from the low position to the high position. The armrest 10 also includes a control member for the motorized system, for example, a button arranged on a flank of the cover 16.

The armrest 10 described above is very compact. Indeed, the entire maneuvering mechanism 18 is arranged in the armrest 10, with a very reduced bulk. No additional part, relative to the cover 16 forming the trim of the armrest 10, is specifically required to hide the mechanism 18.

Furthermore, the space occupied by the maneuvering mechanism 18 in the armrest 10 is small enough to free a central recess 24 and provide a very aesthetically pleasing armrest, with an open-worked trim cover 16.

These advantages therefore improve the quality perceived by the user.

What is claimed is:

1. An armrest for an aircraft seat comprising:
a stationary part configured to be connected to the seat;
a movable part movable relative to the stationary part, between a high position in which the moving part is intended to protrude above a seat bottom of the seat and a low position;
a maneuvering mechanism configured to guide the movement of the movable part between the high position and the low position, the maneuvering mechanism including at least a first connecting rod and a second connecting rod, each independently connecting the stationary part to the movable part, the first connecting rod and the second connecting rod being arranged parallel to one another during the movement of the movable part between the high position and the low position.

2. The armrest according to claim 1, wherein the maneuvering mechanism includes a third connecting rod connecting the stationary part to the movable part, the third connecting rod being arranged parallel to the first connecting rod and the second connecting rod during the movement of the movable part between the high position and the low position.

3. The armrest according to claim 2, wherein the first connecting rod, the second connecting rod and the third connecting rod are mounted rotatingly on the stationary part respectively around a first rotation axis, a second rotation axis and a third rotation axis, the third rotation axis being situated separated from a plane containing the first rotation axis and the second rotation axis.

4. The armrest according to claim 1, wherein the maneuvering mechanism includes a member stressing the movable part toward the high position.

5. The armrest according to claim 4, wherein, from an intermediate position between the high position and the low position, the member stressing the movable part is configured to stress the movable part toward the low position.

6. The armrest according to claim 4, wherein the stressing member includes a pneumatic cylinder connected at a first end to the movable part, and at a second end to one of the first connecting rod or the second connecting rod.

7. The armrest according to claim 6, wherein the second end of the pneumatic cylinder is articulated to one end of the first connecting rod or the second connecting rod, the second end of the pneumatic cylinder being rotatable jointly with the end of the connecting rod.

8. The armrest according to claim 1, including a trim cover defining an upper surface for bearing of a user's arm, the trim cover being supported by the movable part and hiding the stationary part and the maneuvering mechanism.

9. The armrest according to claim 8, wherein the movable part defines a central recess, the trim cover defining a through opening coinciding with the central recess, the maneuvering mechanism and the stationary part being situated separated from the central recess and the through opening.

10. The armrest according to claim 1, including at least one connection configured to connect the stationary part to the seat, the movable part defining a passage aperture for the connection connecting the stationary part to the seat, during the movement of the movable part between the high position and the low position.

11. The armrest according to claim 10, wherein the passage aperture is in the form of an arc of circle.

12. The armrest according to claim 1, further comprising a releasable locking system for locking the movable part in the high position and/or the low position.

13. The armrest according to claim 1, wherein the stationary part is L-shaped.

14. An aircraft seat, including:
a framework,
a seat bottom mounted on the framework,
a seatback mounted on the framework, and
at least one of the armrest according to claim 1, the stationary part being fastened on the framework.

15. A method for maneuvering an armrest according to claim 1 comprising:
moving, from the low position of the movable part, the movable part toward the high position via the maneuvering mechanism, the first connecting rod and the second connecting rod remaining parallel to one another between the low position and the high position.

16. The method according to claim 15, the armrest including a member stressing the movable part toward the high position, the method including, from the high position of the movable part, the following steps:
moving the movable part toward the low position, by exerting a force against the stressing member, to an intermediate position between the high position and the low position, and
past the intermediate position, stressing the movable part toward the low position via the stressing member.

* * * * *